United States Patent
Eifert et al.

(10) Patent No.: US 6,512,651 B1
(45) Date of Patent: Jan. 28, 2003

(54) HELICAL SCAN TAPE TRACK FOLLOWING

(75) Inventors: Fred C. Eifert, Eaton, CO (US); David A. Lawson, Arvada, CO (US); Thai Nguyen, Thornton, CO (US); Shiba P. Panda, Englewood, CO (US)

(73) Assignee: Storage Technology Corporation, Louisville, CO (US)

( * ) Notice: Subject to any disclaimer, the term of this patent is extended or adjusted under 35 U.S.C. 154(b) by 193 days.

(21) Appl. No.: 09/613,932

(22) Filed: Jul. 11, 2000

(51) Int. Cl.[7] .............................. G11B 5/584; G11B 5/58
(52) U.S. Cl. .................................. 360/77.13; 360/77.15
(58) Field of Search ........................... 360/77.13, 77.15, 360/75, 77.01, 76, 77.14, 51

(56) References Cited

U.S. PATENT DOCUMENTS

| | | |
|---|---|---|
| 3,678,220 A | 7/1972 | Luhrs |
| 4,539,615 A | 9/1985 | Arai et al. |
| 5,307,217 A | 4/1994 | Saliba |
| 5,321,570 A | 6/1994 | Behr et al. |
| 5,325,370 A | 6/1994 | Cleveland et al. |
| 5,369,641 A | 11/1994 | Dodt et al. |
| 5,371,638 A | 12/1994 | Saliba |
| 5,432,655 A * | 7/1995 | Nakamura et al. ............ 360/64 |
| 5,478,021 A | 12/1995 | Davis et al. |
| 5,566,032 A | 10/1996 | Cleveland et al. |
| 5,822,491 A * | 10/1998 | Sasaki et al. ........ 360/77.01 X |
| 6,266,204 B1 * | 1/2001 | Nonoyama ............... 360/73.08 |

FOREIGN PATENT DOCUMENTS

EP    0 420 374    4/1991

OTHER PUBLICATIONS

D–3 Tape Transports and Control Systems, pp. 196–201.
Panasonic Technical Guide vol. 1–2, pp. 1–68.
ANSI/SMPTE–264M–1993, pp. 4–13.

* cited by examiner

Primary Examiner—Andrew L. Sniezek
(74) Attorney, Agent, or Firm—Brooks & Kushman P.C.

(57) ABSTRACT

Track positioning of a scanning tape head in a helical tape system may be adversely affected by relative offsets between elements in read element pairs and in write element pairs accessing synchronization patterns. Compensating for variations in the position of read and write elements accessing a given pair of data channels is accomplished by using the relative offset of the first detected synchronization patterns in each pair of data channels as a measure of the relative locations of write elements producing the synchronization patterns and read elements accessing the synchronization patterns. This relative offset is then used to correct subsequent synchronization pattern readings taken from the data channel pair.

16 Claims, 5 Drawing Sheets

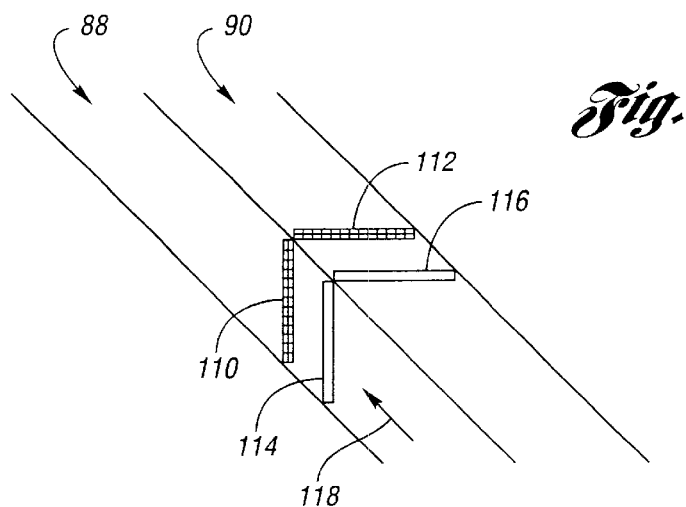
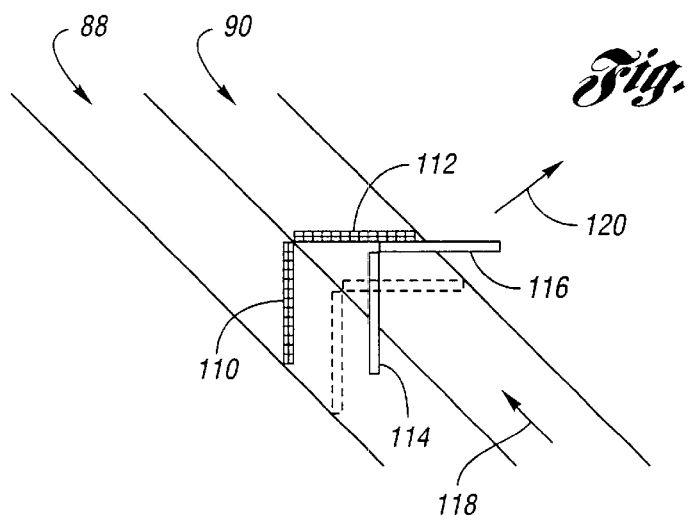
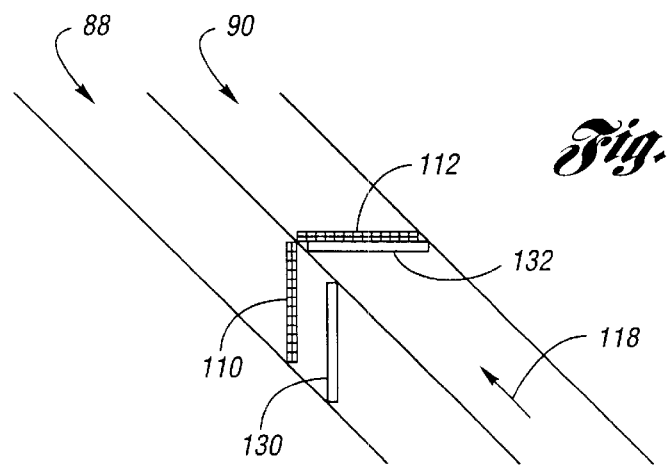

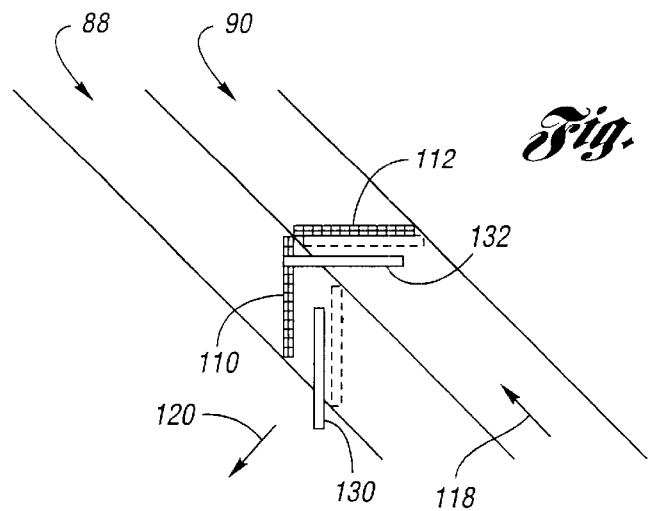
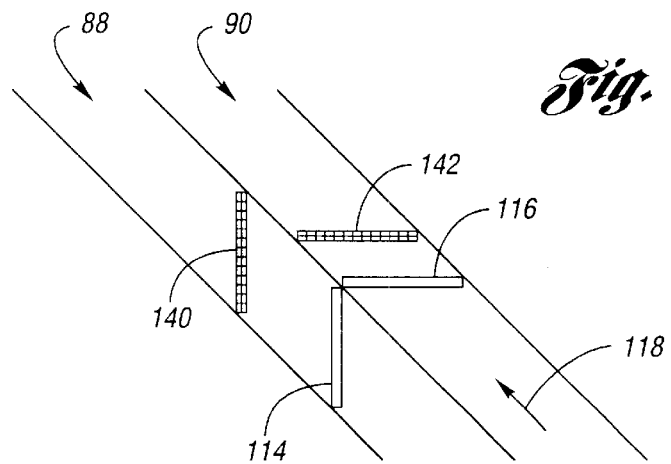
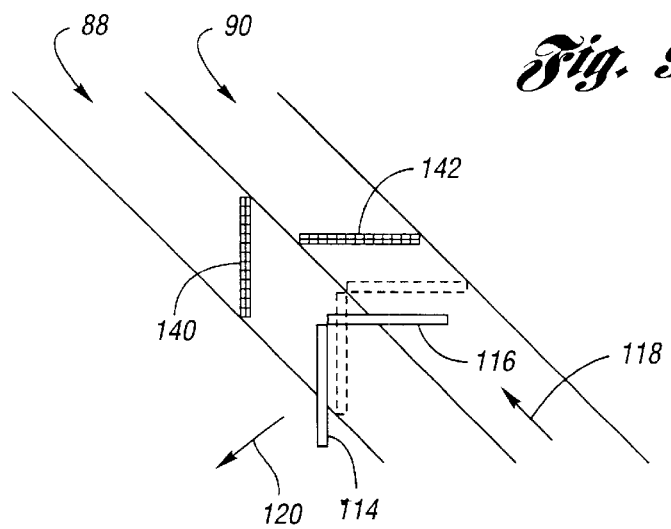

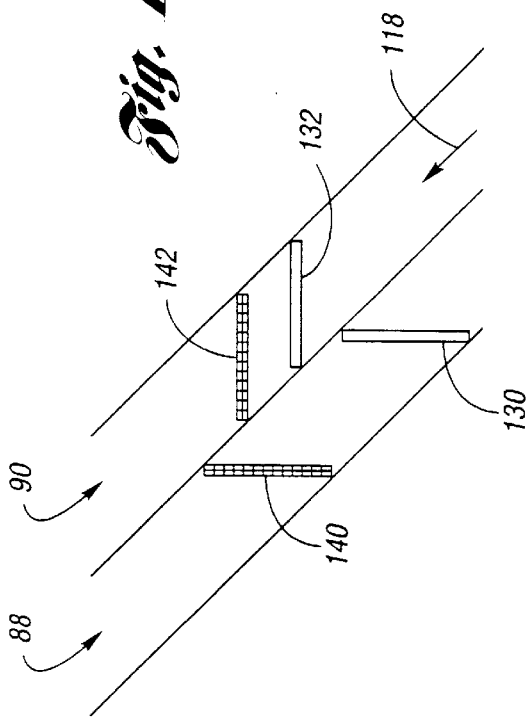
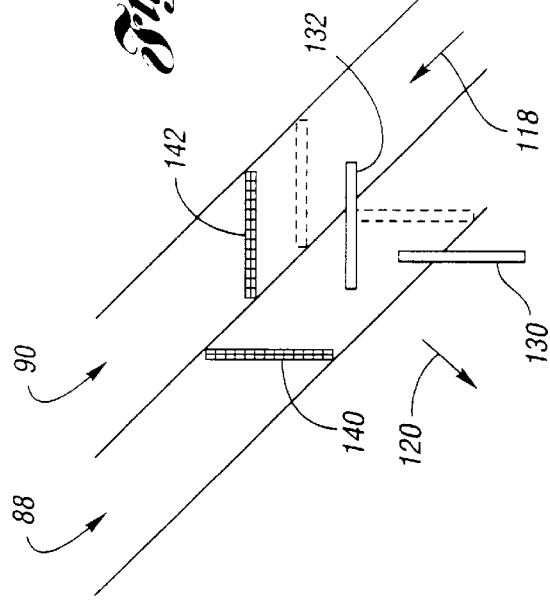
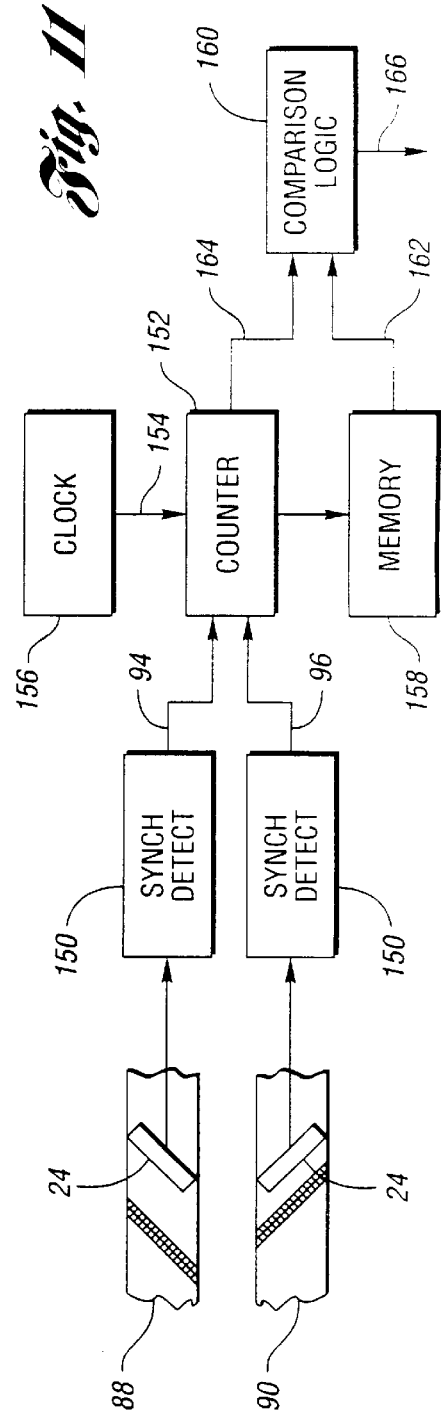

HELICAL SCAN TAPE TRACK FOLLOWING

TECHNICAL FIELD

The present invention relates to following tracking helical data tracks with rotating tape access heads.

BACKGROUND ART

Helical scan tape systems record tracks on magnetic tape at an angle with respect to the edge of the tape by means of a rotary, or helical, tape head. The helical scan system produces high density recording by writing data tracks at an angle across the width of the tape, resulting in high-speed tape access by read and write elements on the tape head without the need for equally high-speed tape motion. Typically, a pair of data tracks, also known as data channels, are simultaneously written onto or read from the tape. Write elements on the tape head are angled in opposing directions so that bit patterns on adjacent track pairs are similarly angled. Typically, there are two pairs of read elements and two pairs of write elements on the tape head, with alternating pairs contacting adjacent data tracks as the tape head rotates.

Data tracks contain data to be stored on the tape together with additional information such as error correction and detection bits and synchronization patterns. When data is read back from the tape, the error correction and detection bits are used to detect and correct data errors that may occur due to debris on the tape, mechanical damage of the tape, tape head tracking errors, and the like. However, only a certain number of erroneous bits may be corrected or detected within the span of data protected by the error correction and detection bits.

Synchronization patterns are used to align the tape head with the data channel pairs, reducing head tracking errors. These patterns are typically written at regular intervals along the length of each data track. Ideally, if the tape head drifts relative to the data channel pair, a synchronization pattern for one track will be read by the read element for that track at a different time than the corresponding synchronization pattern on the second track will be read by the read element for the second track. Control logic uses this time difference to move the head so that read elements are better positioned to read the data tracks.

There are several problems with this head positioning system. The control logic assumes that write element pairs and read element pairs are located on the tape head so as to access a data channel pair at the same location along the length of each data channel. Due to tolerances in the manufacturing process, for example, this may not be the case. Any offset between elements in an element pair will be interpreted by the control logic as a head tracking error. This problem is compounded by the possibility for offset in both read element pair location and write element pair location. A further complication is the variance introduced by using different tape systems to write the data and subsequently read the data. Other factors, including tape wear, tape stretching, temperature effects, and the like, may introduce still further sources of disturbance in calculating head tracking position.

What is needed is a helical tape tracking system and method that compensates for variations in read and write element positioning relative to a data track. Improved track following should be attained without significantly affecting the operation or performance of the tape system or adding significant cost. A system including the improved track following features should operate with tape recorded on previous tape systems and should produce tapes that can be read by previous tape systems.

DISCLOSURE OF THE INVENTION

Accordingly, the present invention should detect and compensate for variations in the position of read and write elements accessing a given pair of data channels. This may be accomplished by using the relative offset of the first detected synchronization patterns in each pair of data channels as a measure of the relative locations of write elements producing the synchronization patterns and read elements accessing the synchronization patterns. This relative offset is then used to correct subsequent synchronization pattern readings taken from the data channel pair.

A helical scan tape drive is provided that improves track following. The drive includes a scanning tape head with at least one read element pair. Each read element pair has a first read element and a second read element not parallel with the first read element. The read elements concurrently read a first helical data track and a second helical data track written onto magnetic tape, each data track having a plurality of spaced apart synchronization patterns. A tape drive moves magnetic tape having a plurality of helical data tracks past the tape head. A servo positions read elements across the data track pair. A control unit detects synchronization patterns read from the first data track and the second data track. A first time interval between synchronization patterns detected from the first data track and the second data track is determined at the start of the first data track and the second data track. Additional time intervals between synchronization patterns detected from the first data track and the second data track are determined after the start of the data tracks. A tape head track offset is determined based on the first time interval and at least one additional time interval. The control unit may thus determine relative position between the write elements that wrote synchronization patterns appearing on the data track pairs, between read elements reading the synchronization patterns, or the combined effect of both.

In an embodiment of the present invention, the control unit includes a clock generating clock pulses. A counter counts clock pulses between synchronization patterns detected from the first data track and the second data track. A memory holds the counter value for the first time interval. Logic determines the difference between the counter value held in the memory and the current counter value.

A method of compensating for data track path variance seen by a tape head accessing a pair of helical data tracks recorded on magnetic tape is also provided. A first time is determined between detecting a first synchronization pattern on each of the helical data tracks at the start of reading the pair of data tracks. At least one subsequent time is determined between detecting a subsequent synchronization pattern on each of the helical tracks. The data track path variance is then determined based on the first time and the subsequent time. A control signal may then be generated to move the tape head relative to the data tracks.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a schematic diagram illustrating a tape head correctly aligned with a pair of data tracks;

FIG. 7 is a schematic diagram illustrating a tape head misaligned with a pair of data tracks;

FIGS. 8A and 8B are schematic diagrams illustrating a tape head with offset read elements;

FIGS. 9A and 9B are schematic diagrams illustrating a tape head accessing a pair of data tracks written by offset write elements;

FIGS. 10A and 10B are schematic diagrams illustrating a tape head with offset read elements accessing a pair of data tracks written by offset write elements; and FIG. 11 is a block diagram of logic for tracking helical data tracks according to an embodiment of the present invention.

BEST MODES FOR CARRYING OUT THE INVENTION

Figure 1:
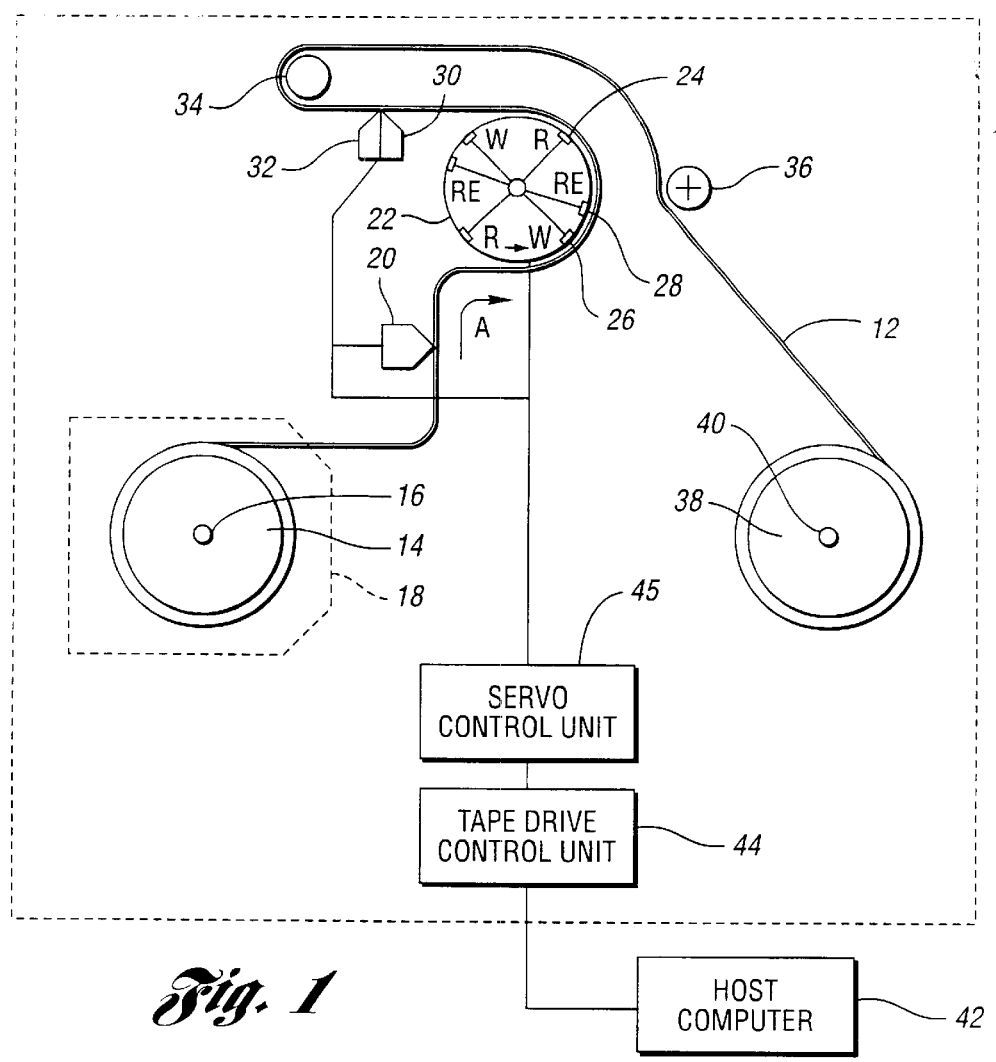
FIG. 1 is a block diagram illustrating a helical scan tape drive according to an embodiment of the present invention.

Referring to FIG. 1, a block diagram illustrating a helical scan tape drive according to an embodiment of the present invention is shown. Helical scan tape drive 10 reads data from and writes data onto magnetic tape 12. Magnetic tape 12 is wound on reel 14 which rotates around spindle 16 within magnetic tape cartridge 18. In helical scan tape drive 10, magnetic tape 12 from magnetic tape cartridge 18 is threaded in direction A past a fixed full width erase head 20. Tape 12 proceeds around scanning tape head 22 which contains two pairs of helical read elements 24, two pairs of helical write elements 26, and one pair of erase elements 28. Tape 12 then passes over fixed longitudinal erase head 30, over fixed longitudinal read/write head 32, around guide 34, over capstan 36, and is wound on machine reel 38 which rotates around spindle 40.

The tape wrap angle around tape head 22 is greater than 180° so that a pair of helical read elements 24, a pair of helical write elements 26, and one erase element 28 are always in contact with magnetic tape 12 allows continuous reading and writing of data. Write element pairs 26 simultaneously record two channels of data on a track at a time on magnetic tape 12 with an azimuth angle between adjacent tracks being approximately ±20°. Similarly, read element pairs 24 simultaneously play back two channels of data on a track at a time from magnetic tape 12. Longitudinal read/write elements 32 read and write data on the corresponding two longitudinal tracks contained on magnetic tape 12 for control and time code tracks.

When writing to tape 12, host computer 42 transmits a stream of data to control unit 44 in helical scan tape drive 10. The data records are formatted for writing on magnetic tape 12, including error correction and detection bits and synchronization patterns, and forwarded to the appropriate write elements 26 in tape head 22. Similarly, data read from tape 12 by tape head 22 is converted to a format expected by host computer 42 before the stream of data is transmitted to host computer 42.

The position of tape head 22 relative to tape 12 is controlled by servo control unit 45 which receives pulses indicated when read elements 24 read synchronization patterns, determines the alignment of tape head 22, and positions tape head 22 relative to tape 12 with a servo drive. In an embodiment of the present invention, control unit 45 determines a first time interval between detecting a first synchronization pattern on a first tape track and detecting a first synchronization pattern on a second tape track. A plurality of second time intervals between detecting another synchronization pattern on the first tape track and detecting another synchronization pattern on the second tape track are determined. A positional error between the tape tracks and tape head 22 is determined based on the first time interval and each of the plurality of second time intervals. Tape head 22 is adjusted relative to the tape tracks based on the determined positional error.

Figure 2:
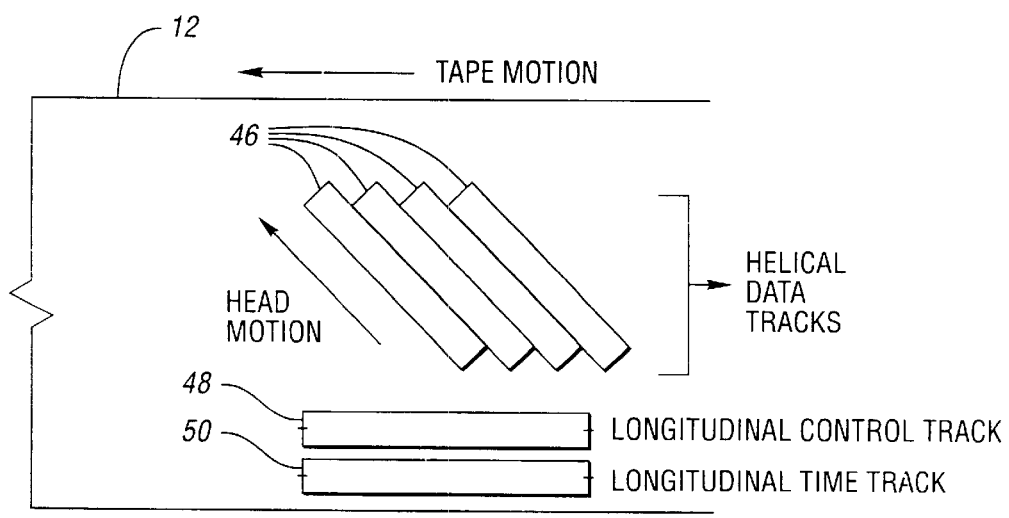
FIG. 2 is a schematic diagram illustrating the data recording format of a helical scan magnetic tape.

Referring now to FIG. 2, a schematic diagram illustrating the data recording format of a helical scan magnetic tape is shown. As two adjacent helical write elements 26 of tape head 22 move across magnetic tape 12, two helical data tracks 46 are simultaneously written onto magnetic tape 12. Once tape head 22 has completed one-half revolution, the other pair of helical write elements 26 begins to write the next two adjacent helical tracks 46 onto magnetic tape 12. Magnetic tape 12 also includes longitudinal servo control track 48 and longitudinal time code track 50. Servo control track 48 is recorded as helical tracks 46 are written onto magnetic tape 12. One use of servo control track 48 is to synchronize the rotation of tape head 22 with the position of helical tracks 46 on magnetic tape 12 during playback. Time code track 50 contains location information that uniquely identifies groups of helical tracks 46.

Figure 3A:
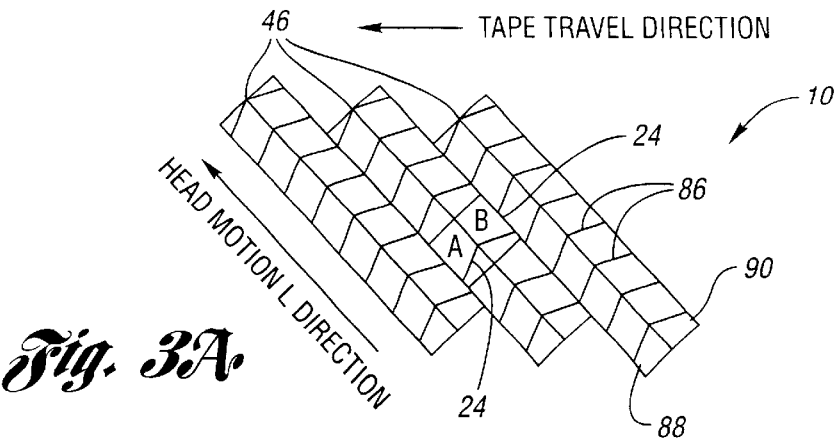
FIGS. 3A and 3B illustrate in greater detail the data recording format of the magnetic tape.
Figure 3B:
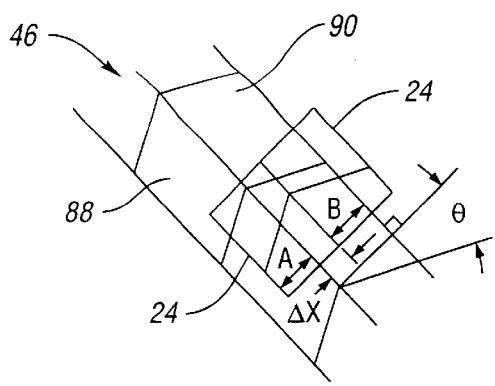

Referring now to FIGS. 3A and 3B, with continued reference to FIGS. 1 and 2, the operation of helical scan tape drive 10 will be described in greater detail. In helical scan tape drive 10, helical tracks 46 are written at an angle with respect to the edge of magnetic tape 12. This is achieved by wrapping magnetic tape 12 partially around angled, rotating tape head 22. Read elements 24 and write elements 26 are precisely aligned in tape head 22 and protrude slightly from its outer surface. As magnetic tape 12 moves past rotating tape head 22, read elements 24 and write elements 26 access angled helical tracks 46 on magnetic tape 12 as shown. Each helical track 46 includes a pair of data tracks or channels 88 and 90.

Read elements 24 are positioned just behind write elements 26 thereby allowing the data to be verified after it has been written to helical tracks 46. This ensures the initial data integrity of each helical track stripe. On reading back the data, read elements 24 can be made to follow helical tracks 46 with automatic servo head tracking control unit 45.

A preferred method for reading helical tracks 46 with a pair of read elements 24 will now be described. When data is written, synchronization pattern 86 is inserted at regular intervals on data channels 88 and 90 of helical track 46. Typically, synchronization pattern 86 is a binary sequence that can be recognized by servo control unit 45. If head construction and tracking is perfect, there is no time difference in the synchronization detection. However, when an offset azimuth position difference, indicated by $\Delta x$, occurs in helical track 46, the azimuth time difference of the synchronization pattern reproduced in the two data channels 88 and 90, $\Delta t$, is given by Equation 1.

$$\Delta t = \frac{2 \times \Delta x \times \tan\theta}{v} \quad (1)$$

where $\theta$ is the azimuth angle of read elements 24 with respect to helical tracks 46 and $v$ is the relative velocity between the read elements and the magnetic tape. Hence, if read elements 24 are off track by Δx, the azimuth time difference Δt can be determined. Conversely, if the azimuth time difference Δt is measured, the azimuth position difference Δx can be determined.

Figure 4:
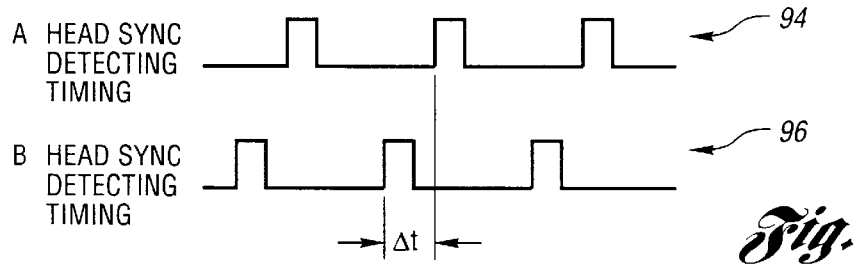
FIG. 4 is a graph illustrating detected synchronization patterns from a pair of helical data tracks.

Referring now to FIG. 4, a graph illustrating detected synchronization patterns from a pair of helical data tracks is shown. Synchronization signals 94 and 96 are generated by servo control unit 45 by detecting synchronization patterns 86 read from channels 88, 90 respectively. In a typical tape drive 10, 408 synchronization patterns 86 are written on each channel 88, 90 spaced apart by 12.27 microseconds at operational speed. Each assertion in synchronization signals 94, 96 corresponds to a read element 24 crossing a synchronization patter 86. If channels 88, 90 were written by a pair of write elements 26 with no relative offset and if channels 88, 90 are read by a pair of read elements 24 with no relative offsets, the azimuth time difference Δt is proportional to the azimuth position difference Δx as expressed by Equation 1. However, if read elements 24 or write elements 26 have relative offsets, Δt will include the effects of those relative offsets.

Figure 5:
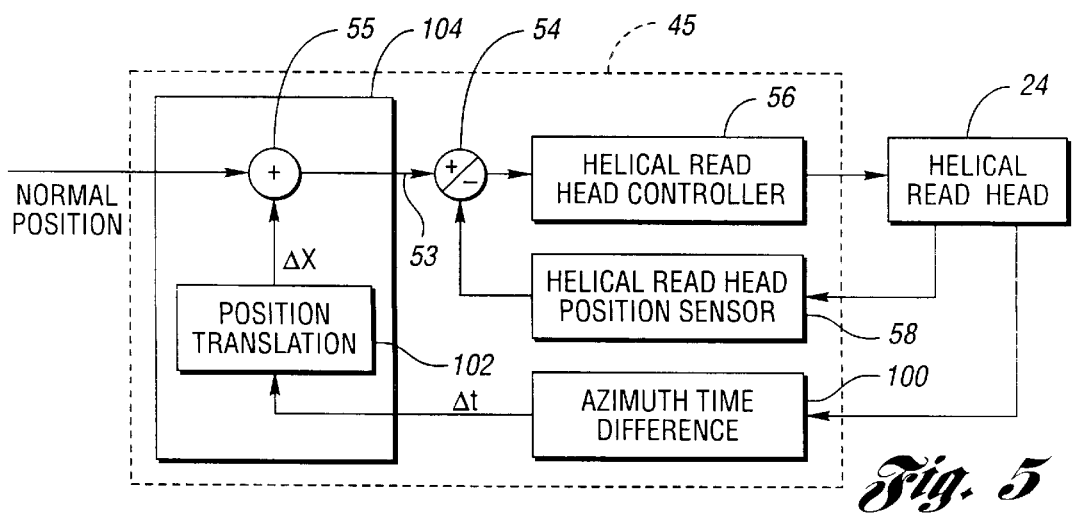
FIG. 5 is a block diagram illustrating a helical scan tape head position controller according to an embodiment of the present invention.

Referring now to FIG. 5 with continued reference to FIG. 1, a block diagram illustrating a helical scan tape head position controller according to an embodiment of the present invention is shown. FIG. 5 represents a system implemented with a combination of hardware and software. It will be recognized by one of ordinary skill in the art that the controller may be implemented entirely by hardware, including discrete logic, custom integrated circuits, programmable logic components, and the like; by software executing on a processor with appropriate input and output conditioning circuitry; or by any other suitable means. The present invention is independent of the techniques and devices used in a particular implementation.

Helical read element controller 56 controls the position of read elements 24. Azimuth time difference (ATD) logic 100 monitors read elements 24 and determines the azimuth time difference Δt between synchronization patterns 86 of two data tracks 46. Position translation logic 102, implemented in microprocessor unit 104, translates azimuth time difference Δt into azimuth position difference Δx. Azimuth position difference Δx indicates of how far read elements 24 are off track or are misaligned with tape 12. Azimuth position difference Δx is then summed 55 with a normal position signal to produce a desired position signal 53. The difference between desired position signal 53 and the position of tape head 22 detected by helical position sensor 58 is determined by difference 54 and supplied to head controller 56. The desired position signal is indicative of the desired position that head controller 56 attempts to move read elements 24.

Position sensor 58 may be a mechanical device such as a strain gauge which generates an actual position signal as a function of the actual position of read elements 24 with respect to a known absolute reference. Preferably, position sensor 58 generates an actual position signal sample at predetermined intervals with a fixed number of samples per track. Helical track 46 has a predetermined length such that read elements 24, during normal operation, moves at a predetermined speed to read all of the helical track.

Referring now to FIGS. 6 through 10, schematic diagrams illustrating conceptualized read elements and synchronization patterns written on adjacent data tracks or channels are shown. These drawings are provided to illustrate operation of helical scan systems and not to portray elements to scale.

In FIG. 6, a schematic diagram illustrating a tape head correctly aligned with a pair of data tracks is shown. First channel 88 includes synchronization pattern 110 and second channel 90 includes corresponding synchronization pattern 112. A read element pair includes first read element 114 for reading first channel 88 and second read element 116 for reading second channel 90. Read element pairs 114, 116, traveling in head direction 118, are correctly aligned over channels 88, 90, respectively, and will access synchronization patterns 110, 112, respectively, at the same time.

Referring now to FIG. 7, a schematic diagram illustrating a tape head misaligned with a pair of data tracks is shown. Read elements 114, 116 have shifted from channels 88, 90 in head tracking error direction 120. As a result, read element 116 will access synchronization pattern 112 prior to when read element 114 will access synchronization pattern 110. As described above, the time difference Δt between reading synchronization patterns 112, 114 may be used to indicate the amount of tracking error Δx and tracking error direction 120. The latter is determined by examining the sign of time difference Δt. However, this calculation assumes that synchronization patterns 110, 112 were written by write elements 26 having no relative offset and that read elements 114, 116 have no relative offset.

Referring now to FIGS. 8A and 8B, schematic diagrams illustrating a tape head with offset read elements are shown. First read element 130, accessing channel 88, is offset behind second read element 132, accessing channel 90, relative to head direction 118. Hence, as shown in FIG. 8A, read element 132 will access synchronization pattern 112 before read element 130 accesses synchronization pattern 110, even though read elements 130, 132 are centered over channels 88, 90, respectively. As a result, as shown in FIG. 8B, if tape system 10 does not compensate for relative offset between read elements 130, 132, tape head 22 will be moved in head tracking error direction 120, actually introducing a head tracking error.

Referring now to FIGS. 9A and 9B, schematic diagrams illustrating a tape head accessing a pair of data tracks written by offset write elements are shown. First synchronization pattern 140 was written onto first channel 88 by a first write element 26 with an offset relative to a second write element 26 which wrote second synchronization pattern 142 onto second channel 90. Hence, synchronization patterns 140, 142 are offset in head direction 118. As shown in FIG. 9A, read element 116 will access synchronization pattern 142 before read element 114 will access synchronization pattern 140, even though read elements 114, 116 are centered over channels 88, 90, respectively. As a result, as shown in FIG. 9B, if tape system 10 does not compensate for relative offset between write elements 24 writing synchronization patterns 140, 142, tape head 22 will be moved in head tracking error direction 120, again actually introducing a head tracking error.

Referring now to FIGS. 10A and 10B, schematic diagrams illustrating a tape head with offset read elements accessing a pair of data tracks written by offset write elements are shown. In this case, both write elements 26 producing synchronization patterns 140, 142 on channels 88, 90, respectively, and read elements 130, 132 accessing synchronization patterns 140, 142, respectively, have relative offsets. As shown in FIG. 10A, the offsets combine to cause read element 132 to access synchronization pattern 142 significantly before read element 130 accesses synchronization pattern 140. Once again, as shown in FIG. 10B, if tape system 10 does not compensate for the relative offsets, tape head 22 will be moved in head tracking error direction 120, to introduce a head tracking error.

Referring now to FIG. 11, a block diagram of logic for tracking helical data tracks according to an embodiment of the present invention is shown. Azimuth time difference logic 100 includes synchronization pattern detection circuitry 150 for each read element 24. Synchronization pattern detection circuitry 150 output synchronization signals 94, 96 having an asserted pulse each time a synchronization pattern 86 is detected in the output of read element 24. Counter 152 counts clock pulses 154 generated by clock 156 based on control inputs provided by synchronization signals 94, 96. In particular, counter 152 counts the number of clock pulses 154 between assertions in synchronization signals 94, 96. Hence, the value in counter 152 indicates the time between corresponding synchronization patterns 86 from channels 88, 90.

The time between the first synchronization patterns from channels 88, 90 is stored in memory 158. This value represents one or both of the offset between write elements 26 writing synchronization patterns 86 and the offset between read elements 24 reading synchronization patterns 86. Comparison logic 160 compares offset count value 162 stored in memory 158 with latest count value 164 from counter 152 to produce tracking error time signal 166. Preferably, this is a subtraction operation. The resulting value estimates the tracking error of head 22 following channels 88, 90 with any effects due to relative offset in write elements 26 and read elements 24 removed. The sign of the difference indicates head tracking error direction 120. Tracking error time signal 166 may be fed to processor 104 as $\Delta t$ for use in calculating $\Delta x$ as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A helical scan tape drive comprising:
    a scanning tape head with at least one read element pair, each read element pair comprising a first read element and a second read element not parallel with the first read element, the first read element and the second read element operative to concurrently read a first helical data track and a second helical data track written onto magnetic tape, the first data track and the second data track having a plurality of spaced apart synchronization patterns;
    a tape drive operative to move magnetic tape having a plurality of helical data tracks past the tape head;
    a servo operative to position the first read element and the second read element across the first data track and the second data track; and
    a control unit in communication with the first read element, the second read element, and the servo system, the control unit operative to:
        (a) detect synchronization patterns read from the first data track,
        (b) detect synchronization patterns read from the second data track,
        (c) determine a first time interval between synchronization patterns detected from the first data track and the second data track at the start of the first data track and the second data track,
        (d) determine a plurality of additional time intervals between synchronization patterns detected from the first data track and the second data track after the start of the first data track and the second data track, and
        (e) determine a tape head track offset based on the determined first time interval and at least one determined additional time interval.

2. A helical scan tape drive as in claim 1 wherein the control unit is further operative to signal the servo to compensate for determined read track offset.

3. A helical scan tape drive as in claim 1 wherein the control unit comprises:
    a clock generating clock pulses;
    a counter operative to count clock pulses between synchronization patterns detected from the first data track and the second data track;
    a memory holding a counter value for the first time interval; and
    logic operative to determine the difference between the counter value held in the memory and the current counter value.

4. A helical scan tape drive as in claim 1 wherein the control unit determines displacement between the first read element and the second read element.

5. A helical scan tape drive as in claim 1, the tape head further having a first write element and a second write element not parallel with the first write element, the first write element and the second write element operative to concurrently write a first helical data track and a second helical data track, wherein the control unit determines displacement between the first write element and the second write element.

6. A helical scan tape drive as in claim 5 wherein the control unit determines combined displacement between the first read element and the second read element and between the first write element and the second write element.

7. A helical scan tape drive as in claim 1 wherein the control unit is further operative to determine a direction of tape head track offset based on the sign of the difference between the first time interval and the at least one determined additional time interval.

8. A method of compensating for data track path variance seen by a tape head accessing a pair of helical data tracks recorded on magnetic tape, the method comprising:
    determining a first time between detecting a first synchronization pattern on each of the helical data tracks at the start of reading the pair of data tracks;
    determining at least one subsequent time between detecting a subsequent synchronization pattern on each of the helical tracks; and
    determining the data track path variance based on the first time and the subsequent time.

9. A method of compensating for data track path variance as in claim 8 further comprising generating a control signal to move the tape head relative to the data tracks.

10. A method of compensating for data track path variance as in claim 8 wherein determining a first time between detecting the first synchronization pattern on each of the helical data tracks at the start of reading the pair of data tracks comprises counting clock pulses between an elapsed time separating detecting the first synchronization patterns on each of the helical data tracks.

11. A method of compensating for data track path variance as in claim 8 wherein the tape head includes a read element for each data track and a write element for each data track, the method further comprising determining the combined offset as the offset between the read element for each data track and the offset between the write element for each data track based on the determined first time.

12. A method of compensating for data track path variance as in claim 8 further comprising determining a direction of data track path variance based on a difference between the first time and the subsequent time.

13. A method of following helical scan tape tracks comprising:
    concurrently reading two tape tracks with a scanning tape head;
    determining a first time interval between detecting a first synchronization pattern on a first tape track and detecting a first synchronization pattern on a second tape track;
    determining a plurality of second time intervals between detecting another synchronization pattern on the first tape track and detecting another synchronization pattern on the second tape track;
    determining a positional error between the tape tracks and the tape head based on the first time interval and each of the plurality of second time intervals; and
    adjusting the tape head relative to the tape tracks based on the determined positional error.

14. A method of following helical scan tape tracks as in claim 13 wherein determining a first time interval and determining each of the plurality of second time intervals comprises generating a clock signal and counting the number of clock signal periods between detecting a synchronization on the first track and detecting a synchronization pattern on the second track.

15. A method of following helical scan tape tracks as in claim 13 wherein determining the positional error between the tape tracks and the tape head comprises taking the difference between the first time interval and each of the plurality of second time intervals.

16. A method of following helical scan tape tracks as in claim 15 wherein determining a positional error comprises determining a direction of offset between the tape head and the tape tracks based on the sign of the difference between the first time interval and each of the plurality of second time intervals.

* * * * *